US006708598B2

(12) United States Patent
Lassota

(10) Patent No.: US 6,708,598 B2
(45) Date of Patent: Mar. 23, 2004

(54) BEVERAGE DISPENSER WITH COVER ASSEMBLY AND METHOD

(75) Inventor: Zbigniew G. Lassota, Long Grove, IL (US)

(73) Assignee: Food Equipment Technologies Company, Inc., Lincolnshire, IL (US)

( * ) Notice: Subject to any disclaimer, the term of this patent is extended or adjusted under 35 U.S.C. 154(b) by 244 days.

(21) Appl. No.: 09/930,923

(22) Filed: Aug. 16, 2001

(65) Prior Publication Data

US 2003/0034361 A1 Feb. 20, 2003

(51) Int. Cl.[7] .................................................. A47J 31/00
(52) U.S. Cl. ............................................ 99/279; 99/306
(58) Field of Search .................... 99/279, 306; 426/433

(56) References Cited

U.S. PATENT DOCUMENTS 4,667,587 A * 5/1987 Wunder
5,150,803 A * 9/1992 Cartellone
5,233,914 A * 8/1993 English
5,699,719 A * 12/1997 Lucas et al.
5,970,849 A * 10/1999 Baumann et al.

FOREIGN PATENT DOCUMENTS

FR 2828392 * 8/2001

* cited by examiner

*Primary Examiner*—Anthony Weier
(74) *Attorney, Agent, or Firm*—James W. Potthast; Potthast & Associates

(57) ABSTRACT

A beverage dispenser (20) with a top assembly (26) having a pivotally mounted closure cover (50) with an inlet access opening (56) and a stopper (54) of contrasting color pivotally mounted to the underside of the closure cover (50) for movement between a closed position (FIGS. 2, 5) in which the stopper (54) extends through the inlet access opening (56) to block the access opening (56) and to prevent movement of the dispenser (20) beneath a brew basket (58) of an associated brewer (60) for receipt of beverage, and an open position (FIG. 2) in which the stopper (54) held against the underside of the cover closure (50) and spaced from the access opening (56). The closure cover is pivotally mounted to a cover base (62) and is limited in movement by a carry handle (52) when in a lowered position, and is removable for cleaning and removal of a funnel assembly (70) to enable access to the interior through a funnel mounting hole (66) for cleaning. The funnel assembly (70) includes a display (57) with a electronic component housing (164) and a connection (166) to a funnel housing (142) nestled within matching concave sections in the cover base (62) and protectively covered by the closure cover (50).

31 Claims, 9 Drawing Sheets

BEVERAGE DISPENSER WITH COVER ASSEMBLY AND METHOD

BACKGROUND OF THE INVENTION

1. Field of the Invention

This invention relates generally to beverage dispensers and more particularly to beverage dispensers of the type that are portable and are associated with hot beverage brewers which pass freshly brewed beverage directly into the dispenser.

2. Discussion of the Prior Art

Portable hot beverage dispensers of the type that fit snugly beneath the drain hole of brew basket for direct receipt of freshly brewed beverage, such as freshly brewed hot coffee are well known. Such known dispenser has a one to three gallons carrying capacity within an insulated hollow body, a cover with a funnel opening, a pivotally mounted handle and a stopper or closure for closing the funnel opening in the top. The handle is attached to the handle to prevent loss. When it is desired to freshly brewed coffee, for instance, the stopper is removed and the handle is lowered to an inoperative position. The dispenser is then slid beneath the drain hole of a brew basket of a coffee brewer and when freshly brewed coffee passes out of the drain hole it flows directly through the open funnel opening and into the hollow, insulated body. After the dispenser is filled, it is slide out from beneath operative engagement with the brewer, the stopper is inserted close the funnel inlet opening and the handle is raised to an elevated position in which the stopper is locked into closing engagement with the funnel opening to reduce heat loss and to prevent spillage during carrying. The beverage dispenser is then manually moved to a serving cart or is simply carried to a serving location remote from the brewer, such as a on top of the very table at which customers are being served, at a service counter or at a side table or other location.

As soon as one of the dispensers is removed from the brew position beneath the brew basket, another substantially identical dispenser that is empty can be moved into the brew location and a new brew cycle may be commence immediately to fill the identical dispenser while the first dispenser is being used to serve the beverage. Thus, there is no need to wait for the first dispenser to be emptied before more coffee is made and a single brewer can be used to successively fill a series of empty dispensers without delay.

When the handle is in an operative position it extends substantially above the top of the dispenser body. The handle remains in this upwardly extending position during serving for it is in this position in which the stopper is locked into closing engagement with the funnel opening. The raised handle during serving substantially adds to the height of the dispenser and presents a “high profile” configuration that could be considered cumbersome, unsightly and when on a table where people are seated can partially obscure their view of one another when on opposite sides of the dispenser.

Other dispensers of this general type are know in which the stopper or other closure for the funnel opening is not attached to the handle or otherwise attached to the dispenser. In such dispensers, the detached funnel opening closure may become lost or separated from the dispenser location. In addition, particularly from a distance, it is difficult to determine whether the stopper is in the funnel opening, indicating that there is beverage remaining in the dispenser or not, indicating that the dispenser is empty and ready to be refilled. If a dispenser is place beneath the brewer and a brew cycle commences with the stopper still closing the funnel or with beverage remaining in the dispenser the dangerous spilling of hot coffee is the unfortunate result.

SUMMARY OF THE INVENTION

In accordance with the present invention, the foregoing disadvantages of known dispensers are overcome or alleviated.

This objective is achieved in part by providing a beverage dispenser having a hollow body with a closed bottom, a top assembly with an inlet for passing beverage into the hollow body, an enclosing sidewall extending between the top assembly and the bottom, a faucet mounted to the hollow body adjacent the bottom for dispensing beverage contained within the hollow body with a cover assembly having a cover with an inlet access opening, means for mounting the cover for movement between an operative position in which the inlet access opening is aligned with the inlet and the cover overlies the top assembly, and an inoperative position, and means movably mounted to the cover for selectively closing the inlet access opening to prevent access to the inlet when the cover is in the operative position and the inlet access opening is aligned with the inlet.

Preferably, the selectively closing means includes a closure member, and means for mounting the closure member for movement relative to the cover between a closed position in which the closure member closes the inlet access opening and an open position in which the closure member is spaced from the inlet access opening to enable the passage of beverage through the inlet access opening and the through the inlet and into the hollow body. Also, the mounting means includes means for pivotally mounting the closure member to the cover. The cover has an underside adjacent the top when in an operative position and the mounting means includes means for pivotally mounting the closure member to the underside of the cover.

The objective is also achieved in part by providing the dispenser in combination with a beverage brewer with a brew basket at a level to block entry of the hollow body beneath the brew basket with the inlet aligned with the brew basket by means of lateral engagement with the closure member extending above the cover. Preferably, the closure member has a color that contrasts with a color of the cover to enhance visibility of the cover when in the closed position and has a hemispherical surface that extends only slightly above the top when in the closed position.

Also, the beverage dispenser preferably includes a handle and means for movably mounting the handle to the top for movement between an upwardly extending carry position and a generally horizontal non-carry position. The cover is mounted for pivotal movement between the operative position and the inoperative position and the handle is positioned relative to a path of movement of the cover to limit such pivotal movement when the handle is in the generally horizontal non-carry position.

The object of the invention is also obtained in part by providing in association with a beverage dispenser having a hollow body with a closed bottom, a top assembly with an inlet for passing beverage into the hollow body, an enclosing sidewall extending between the top assembly and the bottom, a faucet mounted to the hollow body adjacent the bottom for dispensing beverage contained within the hollow body, a method of brewing beverage into the hollow body by performing the steps of moving a closure member from a closed position in which access to the inlet is closed and the closure member blocks location of the hollow body to a fill position beneath a source of beverage for passage of the beverage through the inlet to an open position in which access to the inlet is provided and the closure member is removed from a blocking position to enable movement of the hollow body to the fill position for receipt of beverage from the source through the inlet, moving the hollow body to the fill location beneath the source for receipt of beverage through the inlet and into the hollow body, passing beverage from the source through the inlet until a preselected amount of beverage has been passed into the hollow body while in the fill position, after the preselected quantity of beverage has been passed, removing the hollow body from the fill position beneath the source, and returning the closure member to the closed position. Preferably, in accordance with the method, the dispenser has a top and the closure member extends above the top when in the closed position to block movement of the beverage dispenser to the fill position beneath the beverage source by engaging the beverage source.

The objective is also achieved in part by providing a beverage dispenser having a hollow body, a closed bottom, a top with an inlet for passing beverage into the hollow body, an enclosing sidewall extending between the top and the bottom, a faucet mounted to the hollow body adjacent the bottom for dispensing beverage contained within the hollow body with a cover assembly having a top assembly with an inlet for mounting sealed receipt of a funnel assembly, a cover base mounted to the top assembly and having a pair of upper sections on either side of an intermediate recessed section for nestled receipt of a movably mounted cover for covering the inlet, means carried by the cover base and adjacent opposite ends of the pair of upper sections for mounting the cover for movement between an operative position in which the cover is nestled between the pair of upper sections and the inlet is covered, and an inoperative position in which the cover is not nestled and the inlet is not covered, and another recessed section surrounding a portion of each of the pair of upper sections and a portion of the cover base located between the pair of upper surfaces for receipt of a carry handle, and a carry handle, means carried by the cover base and adjacent the opposite ends of the upper sections for mounting the carry handle for movement between a non-carry position in which an uppermost surface of the handle is flush with the pair of upper surfaces, and a carry position.

In the preferred embodiment, the carry handle mounting means includes inwardly facing pivot axle receiving bores within opposed vertical faces of the upper surfaces and pivot axle stubs on opposite sides of carry handle, and when the carry handle is in the non-carry position it is positioned to block the cover from pivotal movement beyond a preselected maximum inoperative position.

BRIEF DESCRIPTION OF THE DRAWINGS

The foregoing advantageous features and advantages of the invention will be described in greater detail and others will be made apparent from the detailed description of the preferred embodiment that is given with reference to the several figures of the drawings, in which.

DETAILED DESCRIPTION

Figure 1:
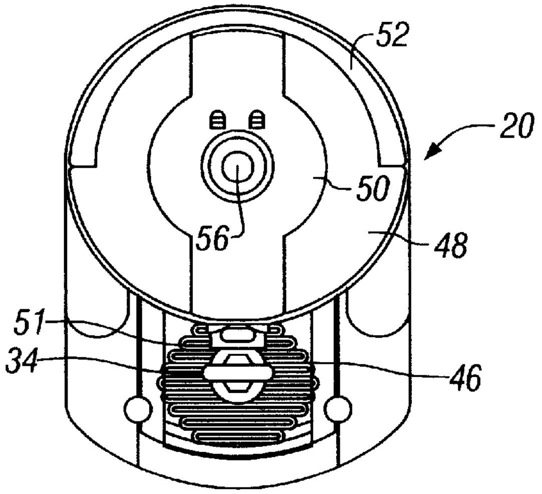
FIG. 1 is a plan view of a preferred embodiment of the beverage dispenser of the present invention.
Figure 2:
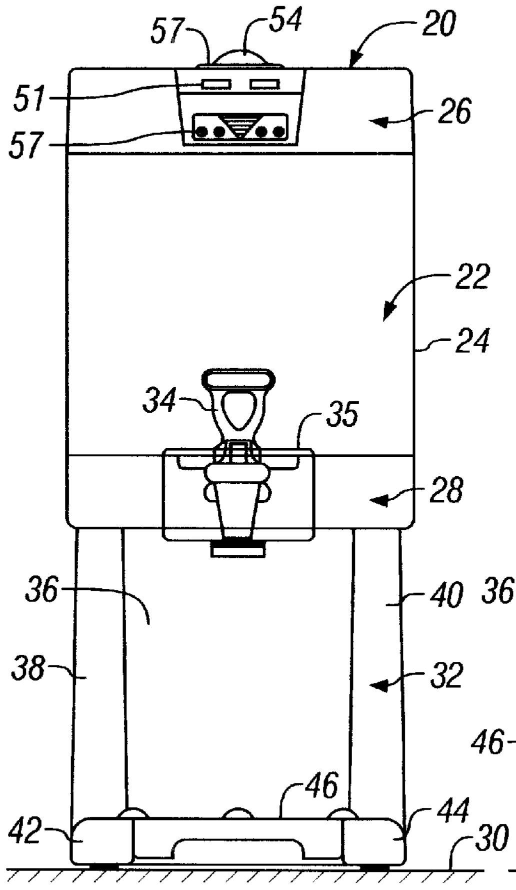
FIG. 2 is a front elevation view of the beverage dispenser of FIG. 1.
Figure 3:
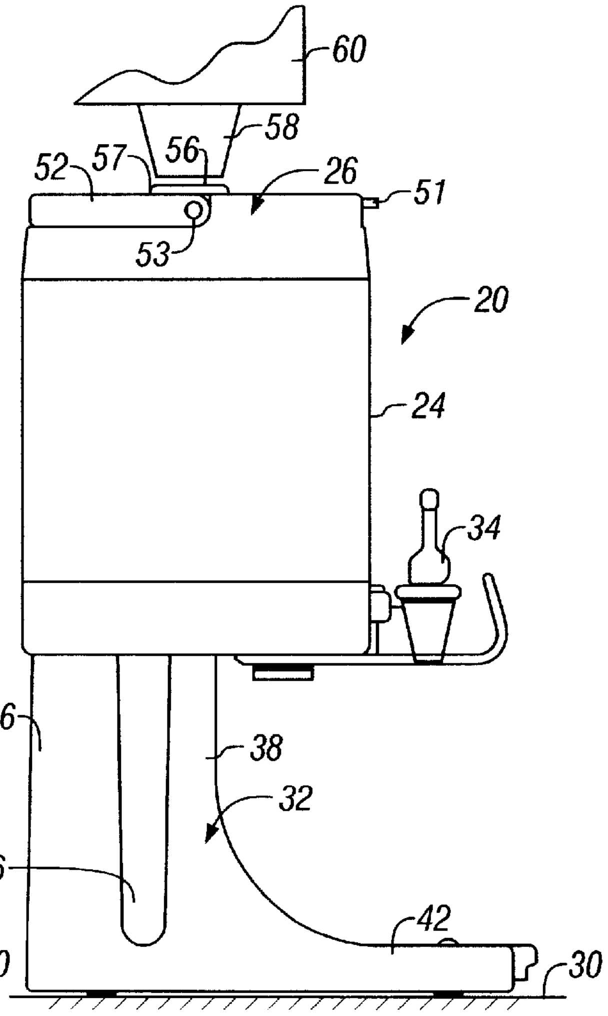
FIG. 3 is a side elevation view of the beverage dispenser of FIGS. 1 and 2.

Referring to FIGS. 1–3, a preferred embodiment of the beverage dispenser 20 of the present invention includes a hollow body assembly 22 with a cylindrical sidewall 24 extending between a top assembly 26 and a bottom assembly 28. The bottom assembly 28 is supported by a base assembly 32 above an underlying support surface 30, such as a counter or a table.

Attached to the bottom assembly 28 is a faucet 34 for dispensing beverage contained within the hollow body 22 into drinking containers, such as coffee cups. A faucet guard 35 protects the faucet against inadvertent contact and against inadvertent engagement of the side of the nozzle with the inside of a cup or other container.

The base assembly 32 includes an upstanding back 36, a pair of upstanding legs 38 and 40 and a pair of forwardly extending horizontal, forwardly extending, base members 42 and 44. A gap 46 between the upstanding legs 38 and 40 and the upstanding back 36 enable the upstanding legs 38 and 40 to be easily grasped by hand and used as convenient handles for moving the portable beverage dispenser 20 in addition to being a graceful structural feature that is aesthetically pleasing. A drip tray assembly 46 is removably mounted and supported between the forwardly extending base members 42 and 44 to catch drips from the faucet 34 and splashes as may occur when a cup is being filled.

The top assembly 26 includes a cover base 48 that is relatively fixedly attached to the top of the hollow body 22. A cover closure 50 is pivotally and removably mounted to the cover base 48. A latch assembly 51 releasably locks the cover base in the closed position as shown. A semicircular handle 52 is fixedly attached to the cover base 48 and mounted for movement about a pivot axis 53, FIG. 3. A brew disable member, or stopper, 54 is mounted to the cover closure 50 for movement between a brew enablement position, in which it is located beneath the cover closure 50 and spaced from a dispenser inlet opening 56 in the cover closure 50, and a brew disablement position. The inlet opening 56 communicates with an inlet of a funnel that is integrated into a single module including an electronic display 57 that graphically displays quantity of beverage and elapsed time since the beverage was freshly brewed directly into the beverage dispenser.

The inlet opening 56 is surrounded by a collar 58 that is closely positioned beneath a drain hole at the bottom of a brew basket 58 of a beverage brewer 60 when the brew disable member 54 is in the brew enablement position. In the brew enablement position, there is only a small gap between the top of the collar 57 and the bottom of the brew basket 58 to reduce heat loss and spillage during brew cycle. When the stopper 54 is moved to the brew disablement position, as shown in FIG. 2, the top of the stopper 54 extends above the top of the collar 58 by an amount greater than the gap between the top of the collar 58 and the bottom of the brew basket 60 thereby blocking the dispenser 20 from being slid beneath the brew basket 58 and thereby preventing use of the beverage dispenser 20.

Preferably, the stopper 54 is of a bright color, such as red or yellow, to provide clear indication that the stopper is in place and to thereby also indicate that the beverage dispenser 20 is not empty and should not be used for receipt of a new batch of brewed beverage that would cause an overflow condition. In accordance with one aspect of the invention, the stopper 54 is only moved to the brew enablement position after a verification has been made that the dispenser has been fully emptied and has sufficient capacity to receive a full batch of freshly brewed beverage without overflowing.

Referring to FIGS. 4, and 22–25, the top assembly 26 is seen to include a cover base 62 having an annular, double-walled, vacuum insulating body 64 with a central, circular, access opening 66. A funnel housing 68 of a funnel assembly 70 is received within the access opening 66. Protectively contained within the funnel housing is a funnel 72 with a funnel inlet 74 at the top that communicates with the beverage dispenser inlet opening 56 surrounded by the collar 57.

Referring to FIGS. 22–25, the cover base 62 is secured to the top of the hollow body 22 by means of four equally spaced threaded fasteners 76 that are screwed into mating threaded bores of mounting posts 78 that are permanently attached to the hollow body 22 by means of welds to the inside surface of the stainless steel outer wall 82 of the top of the double walled hollow body. The cover base has a flat bottom 80 and a contoured upper surface, or top, 82 that is contoured for nestled receipt of the handle 52, the cover closure 50 and the funnel assembly 70 including the electronic display 57. A pair of generally C-shaped, mirror image sections 84 and 86 have the highest top surface level 88. The next highest level 90 is the generally C-shaped section 92 upon which rests the handle 52 when in the down, inoperative position as shown in FIGS. 1–4. This level also coincides with the top level of a collar 93. The next lowest level is the annular shaped section 94 that supports the bottom of the closure cover 50 when mounted to the cover base 62 and surrounding the access opening 66. This is also the surface level from which the collar 57 upwardly extends. The lowest level 96 is the level of the generally rectangular section 98 within which is received the electronic module and display 57 portion of the funnel assembly 70.

Figure 22:
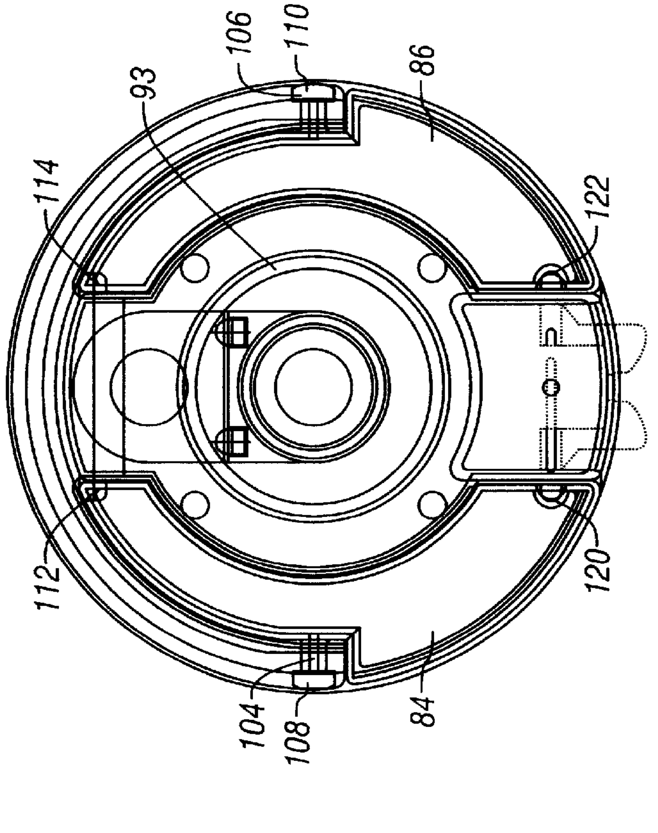
FIG. 22 is a sectional plan view showing the relative locations of the cover base, the funnel assembly, the cover closure, the handle and the pivotal mounting and storage of brew disable member.

The cover base 62 carries a pair of radially extending, opposed, axle stubs 100 and 102 aligned with the pivot axis 53 of the handle 52. The axle stubs 100 and 102 have central bores 104 and 106 to receive fasteners 108 and 110, as best seen in FIG. 22, for attaching the handle 52 to the stubs 100 and 102. The handle 52 has a pair of mating bores on opposite ends within which are received the axle stubs 100 and 102 and the fasteners prevent the axle stubs from sliding off of the stubs when the handle 52 is being used in a carry position to support all of the weight of the beverage dispenser 20.

Figure 6:
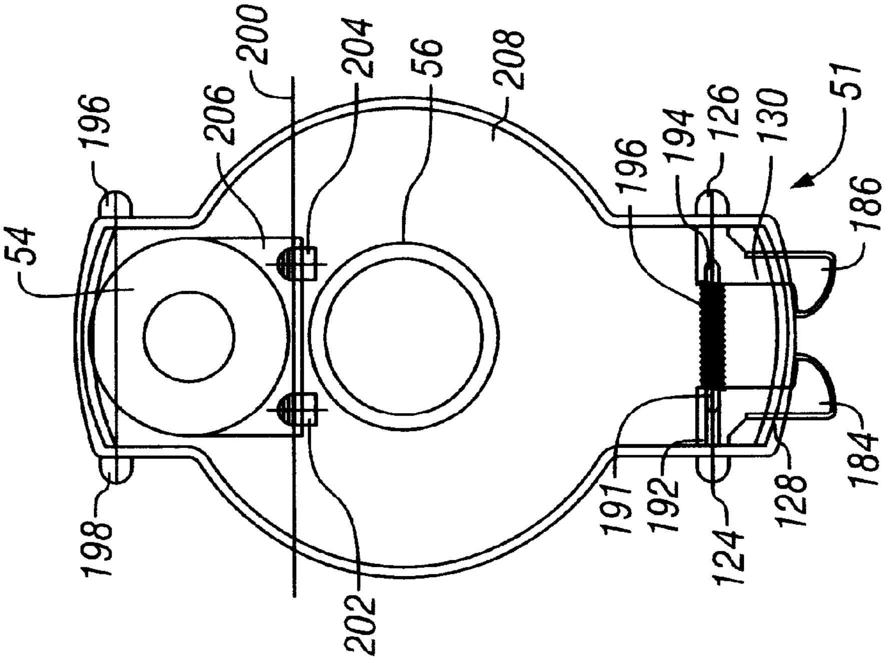
FIG. 6 is an enlarged bottom view of only the cover closure portion of FIG. 5 with to better illustrate the cover latch that latches the cover closure to the cover base in a closed position.
Figure 5:
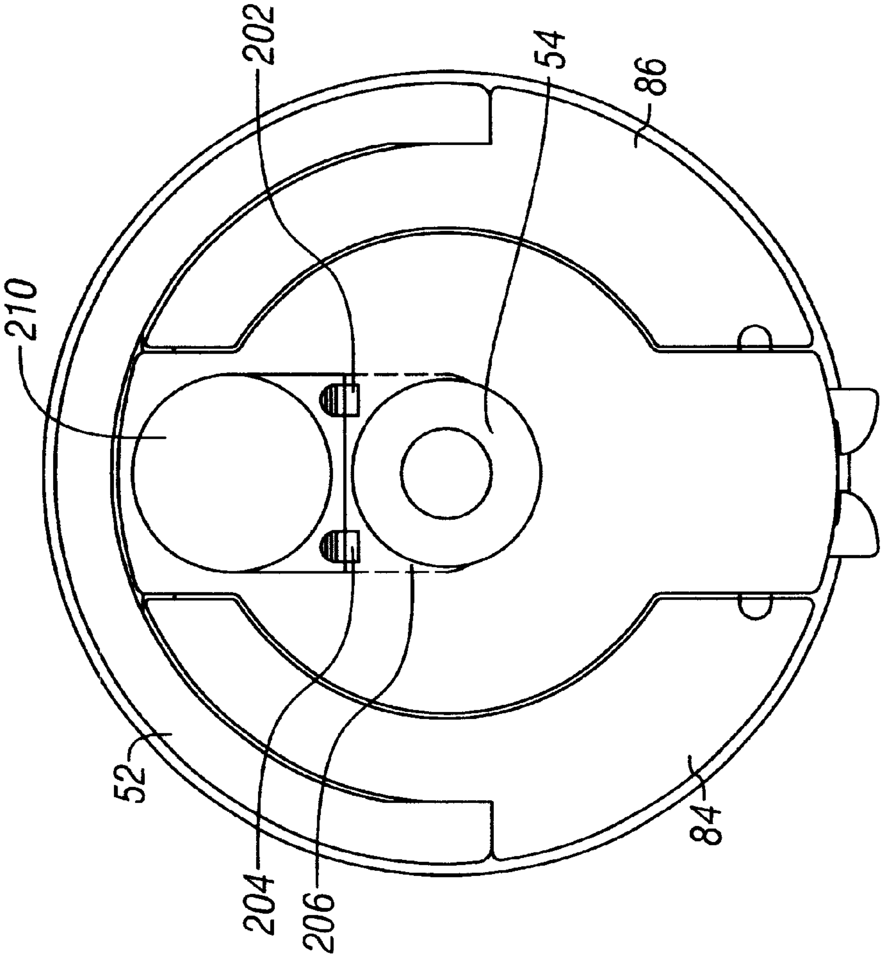
FIG. 5 is a plan view of the cover assembly including the cover base mounted in a closure position to the dispenser body and the cover closure pivotally mounted to the cover base.
Figure 15:
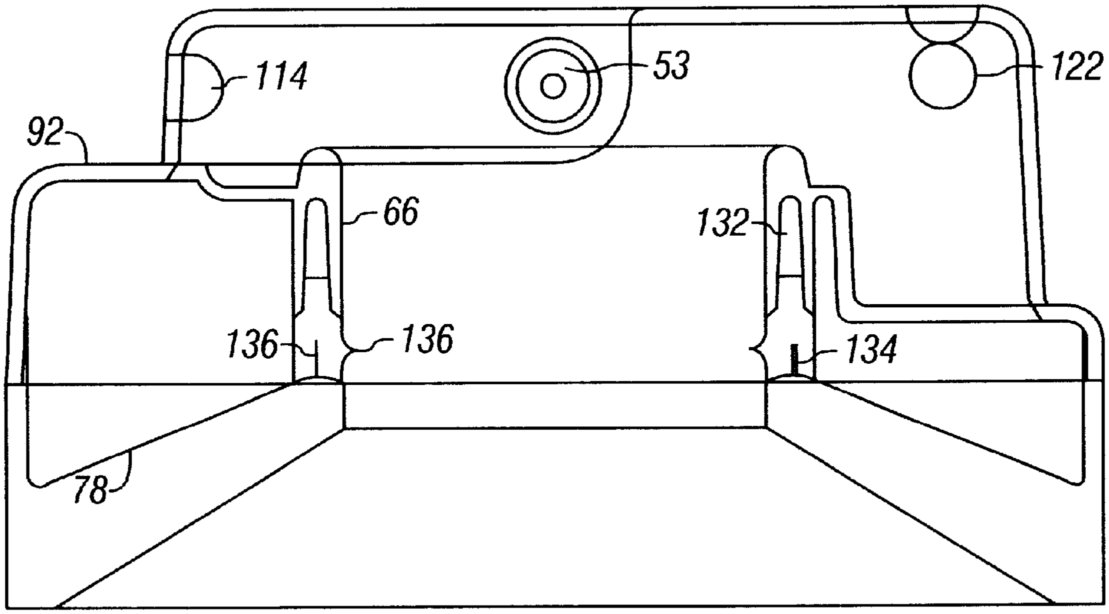
FIG. 15 is another sectional side elevation view similar to that of FIG. 14 but in which the funnel assembly has been entirely removed for access to the interior of the dispenser body to enable manual insertion into the interior of the dispenser body for cleaning and for cleaning of the funnel assembly, itself.
Figure 20:
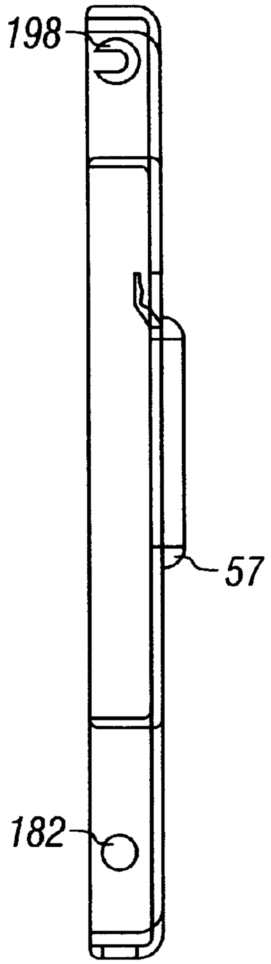
FIG. 20 is a sectional side elevation view of the cover closure of FIG. 19 showing the lateral location of latch finger mounting holes and the pivot axle stub.
Figure 19:
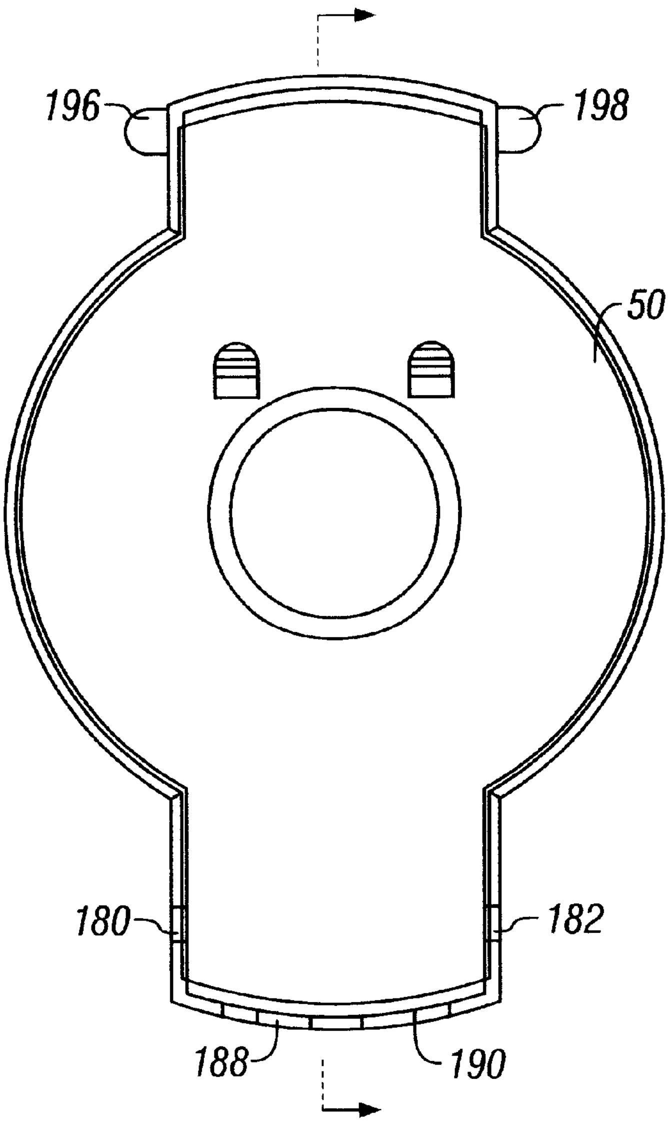
FIG. 19 is a top view of the cover closure member with the latch fingers of FIG. 6 removed.
Figure 21:
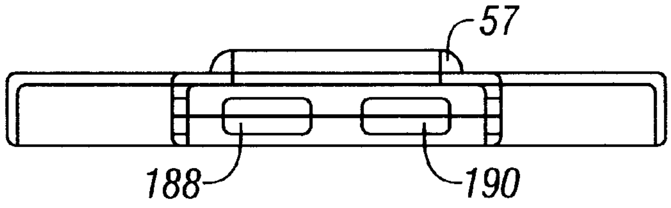
FIG. 21 is a sectional front elevation view showing the location of the latch finger holes through which the movable latch fingers protrude.
Figure 25:
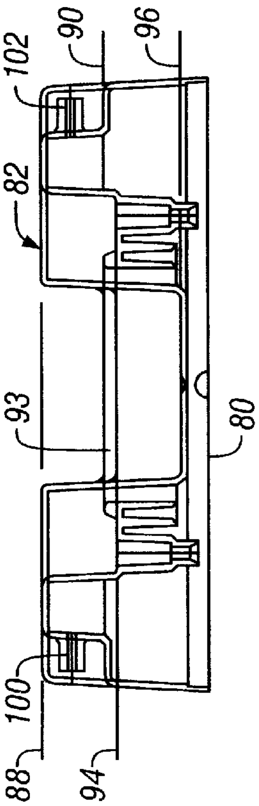
FIG. 25 is a sectional side elevation view of the cover base of FIG. 24 but with the fasteners attaching the cover base to the body of the dispenser.
Figure 24:
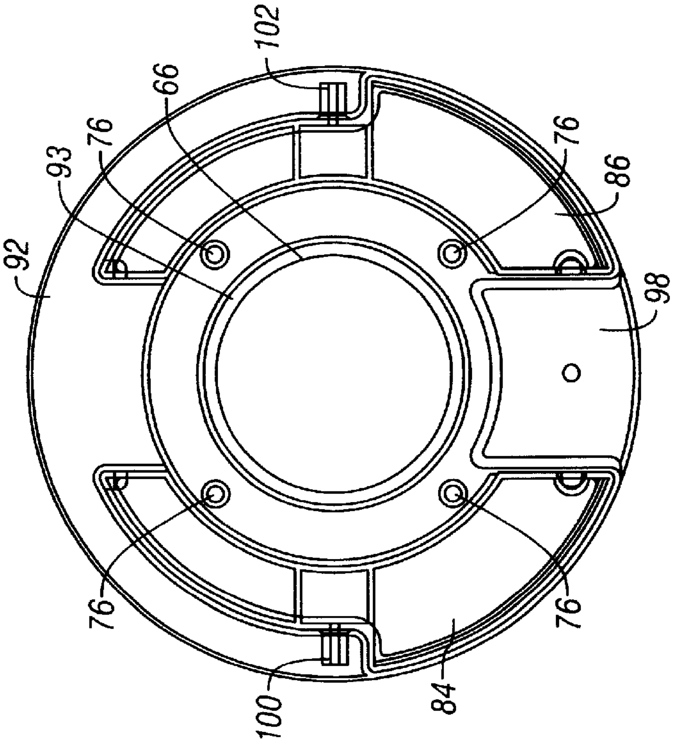
FIG. 24 is a plan view of the cover base with the cover closure and the funnel assembly and the handle removed.
Figure 23:
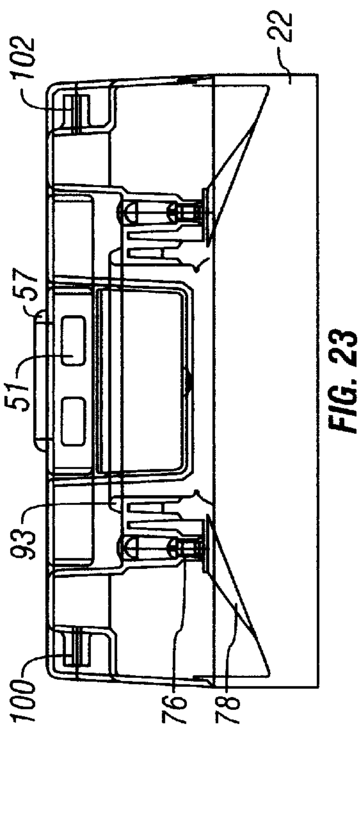
FIG. 23 is a sectional side elevation view of the top portion of the beverage assembly body and the cover base assembly of FIG. 22.

The closure base 62 also includes a pair, backwardly facing, axle receiving slots 112 and 114, FIGS. 15 and 22 for receipt of another pair of axle stubs 116 and 118, FIGS. 19 and 20, of the pivotally mounted closure cover 50. The closure base 62 also includes a pair of inwardly facing, opposed, detents 120 and 122, FIGS. 15 and 22 on opposite sides of the mirror image C-shaped sections 84 and 86. The detents 120 and 122 receive the ends 124 and 126 of latch members 128 and 130 of the latch assembly 51 when in a latched position, as shown in FIG. 6.

Figure 4:
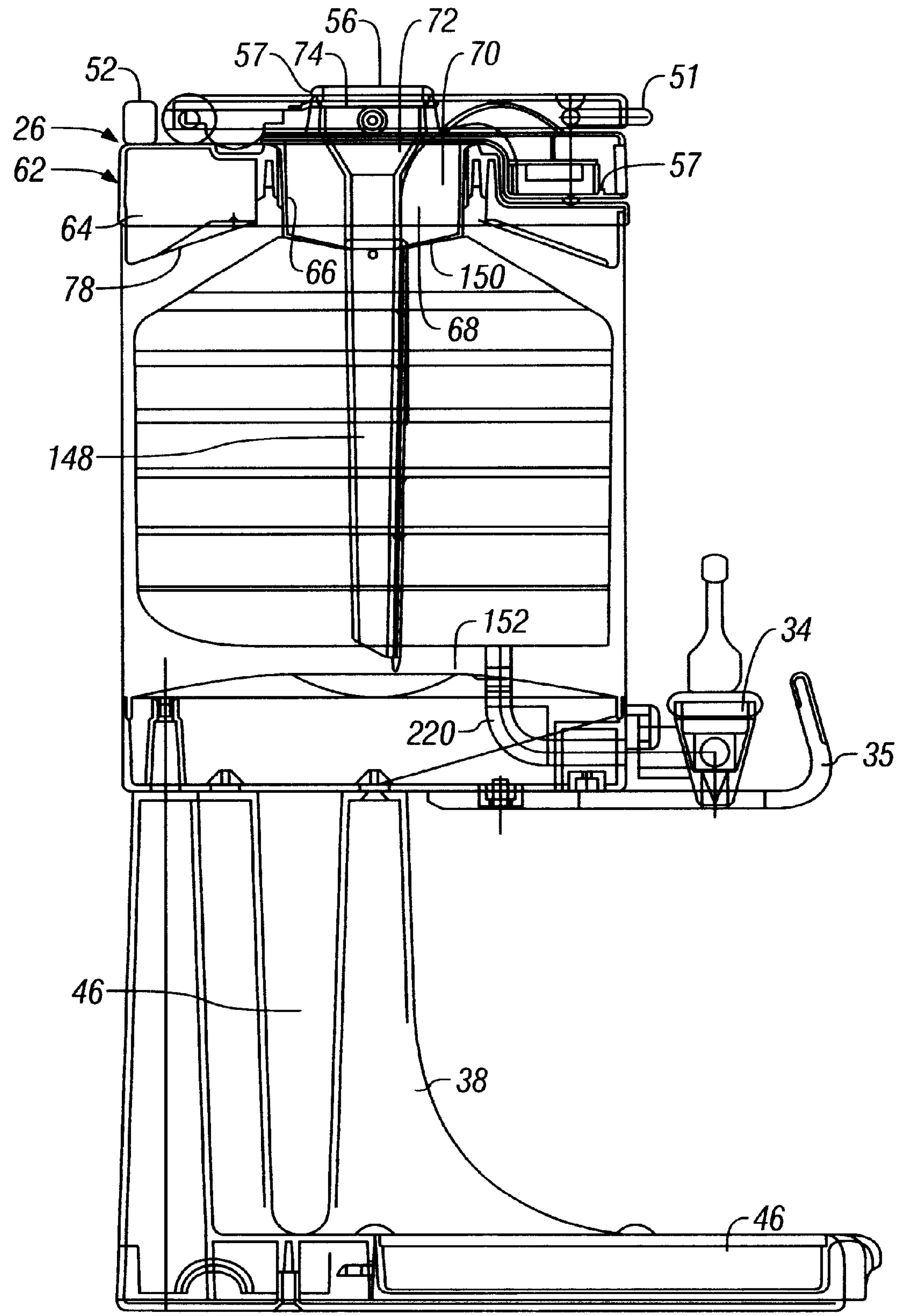
FIG. 4 is a sectional side elevation view of the dispenser of FIG. 3.
Figure 16:
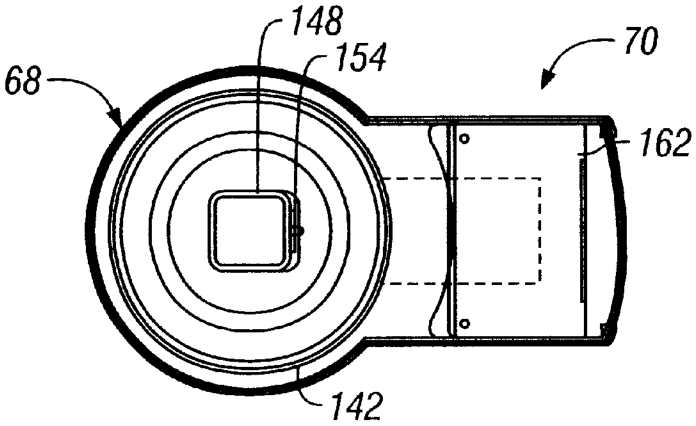
FIG. 16 is a plan view of the funnel assembly of FIGS. 4 and 7–14.
Figure 17:
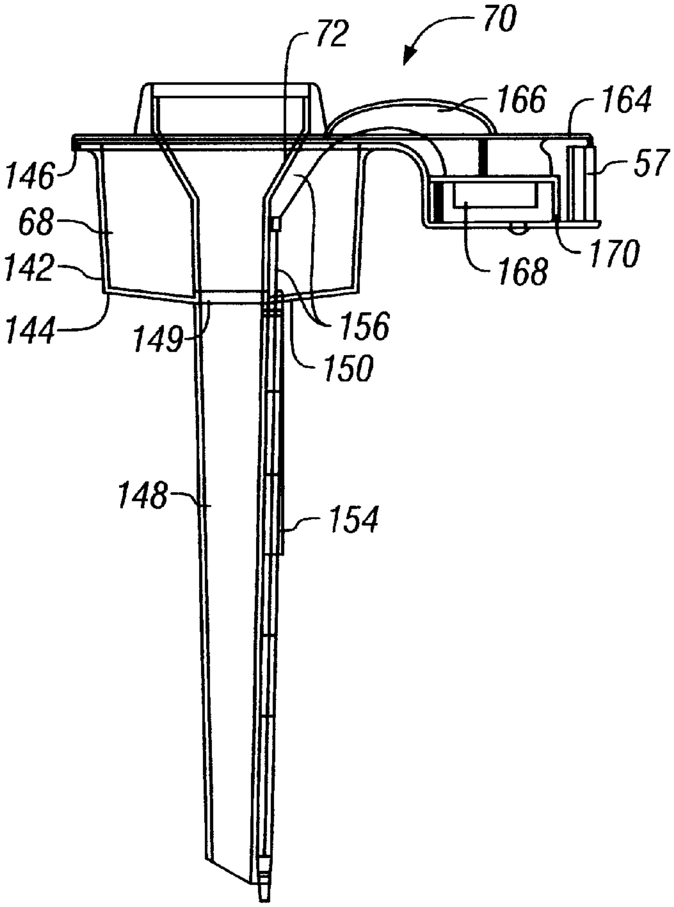
FIG. 17 is a side elevation view of the funnel assembly of FIG. 16.
Figure 18:
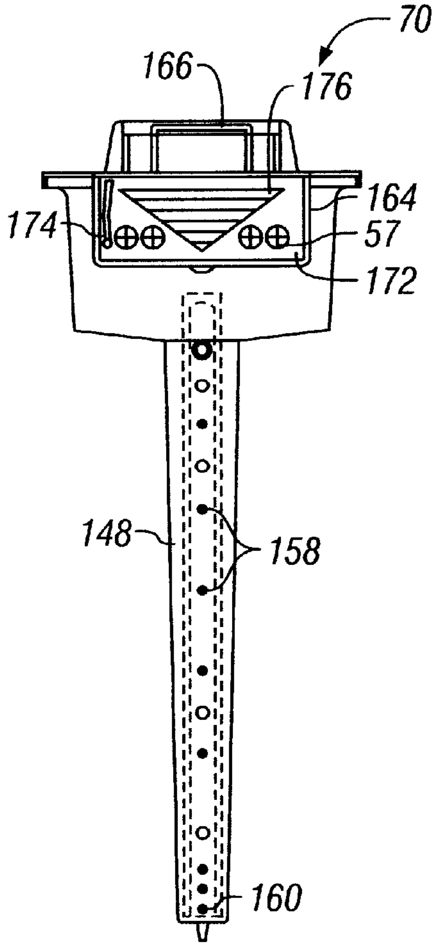
FIG. 18 is a front elevation view of the funnel assembly of FIGS. 16 and 17.

Referring again to FIG. 4 and also to FIG. 15, the cover base 62 has an annular slot 132 for support of the upper part of the body of a resilient, annular seal member 134. The bottom of the seal member 134 has a downwardly facing mounting slot within which is received an annular seal mounting member 136 carried at the end of the mounting post 78. An engagement section 140 of the seal 134 projects inwardly to make sealing contact with the funnel housing 68. Referring also to FIGS. 16, 17 and 18, the outer side 142 of the funnel housing 68 of the funnel assembly 70 is generally cylindrical but has a slight, downward, inward taper, such that the leading edge 144 is easily received within the access opening 66 and through the annular seal 134. As the funnel housing is fully inserted into the access opening 66, the side 142 slides against the inwardly projecting engagement member and increasingly pushes against the engagement member to create a tight seal with the tapered surface when the funnel housing 68 is fully inserted, as shown in FIG. 4. When fully inserted, the underside of a radial, outwardly projecting collar 146 us pressed against the upwardly extending collar 93 of the cover base to create an additional seal and vertical support for the funnel assembly.

The outlet end of the funnel 72 is connected through a watertight connection to a hollow down tube 148. The down tube 148 extends from the bottom 150 of the funnel housing 68 to the bottom 152 of the hollow body, FIG. 4. The down tube 148 is connected to a shared, integrated drain hole 149 at the bottom of both the funnel 72 and the bottom 150 of the funnel housing 68. The down tube 148 supports a conduit 154 carrying electrical leads 156 from a succession of level sensors 158 and possibly a temperature sensor 160. The conduit 154 also passes into the bottom 152 of the funnel housing 68 through a water tight connection through the bottom 150 of the funnel housing.

Radially extending outwardly from the front of the funnel housing 68 is an electronics module 162. The electronics module 162 includes a display electronics housing 164 and an arcuate interconnecting passageway 166 connected between the funnel housing 68 and the display electronics housing 164. The interconnecting passageway 166 protectively encloses the electrical leads 156 from the inside of the bottom of the funnel housing 68 and through an opening in the top of the funnel housing 68 in a space between the wall 142 of the funnel housing 68 and the funnel 72. The leads 156 are connected to a microcomputer 168 contained within the module housing 164 together with a battery power supply 170. The microprocessor 168 functions to control the operation of the display 157 in response to electrical signals received on the leads 156 from the level sensors 158 and the optional temperature sensor 160. The computer has a timer that is reset automatically in response to sensing a rising level in the dispenser body 22 to display elapsed time on time graphic displays 172. The temperature may be shown by a graphic display 174 of a thermometer and the level is shown by a graphic triangular multilevel display 176.

Referring to FIGS. 5, 6, 19, 20 and 21, the engaging ends 124 and 126 of the latch member extend through mating holes 180 and 182. Finger grips 184 and 186 extend through mating holes 188 and 190 in a front wall of the electronic components housing 164 of the closure cover 50. The latch members are connected for relative sliding movement by an interconnecting pin 191 slidably received at opposite ends within mating holes 192 and 194, respectively. A coil spring 196 wrapped around the pin resiliently biases the latch members apart to extend into the latch member receiving 120 and 122, FIG. 22, to keep the closure cover in a latched closed condition to prevent it from pivoting open. When the finger grips 184 and 186 are squeezed together, then the latch engaging ends 124 and 126 are moved inwardly against the force of the spring 196 until they are removed from the latch receiving holes 120 and 122. The closure cover 50 may then be moved to an open position by pivoting it about the axle stubs 196 and 198 received in mating slots 112 and 114. When the cover closure 50 is latched closed, the axle subs 196 and 198 may not be removed from within the slots 112 and 114 and thus the closure cover may not be either opened or removed, but instead is held firmly in place.

When closed, the top of the funnel 72 is pressed firmly against the bottom surface of the cover surrounding the inlet opening 56 to form a seal. When the inlet opening is open, and not closed by the stopper 54, brewed beverage passes through the inlet opening, through the inlet to the funnel 72, trough the funnel 72 and down the down tube 148 to the bottom of the hollow body 22. This is enabled when the stopper 54 has been moved to an open position in which it has been pivoted about a pivot axis 200 that passes through two aligned pivot axles 202 and 204 pivotally connecting a stopper mounting plate 206 to the underside 208 of the closure cover 150. The mounting plate 206 preferably carries the axles 202 and 204 that are snap fit into downwardly facing axle mounting slots.

Figure 11:
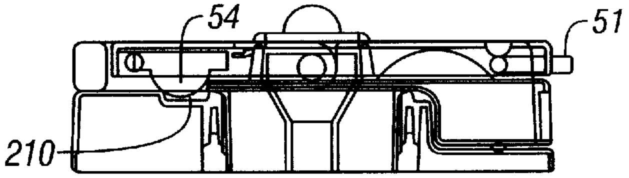
FIG. 11 is another side elevation view similar to that of FIG. 8 but with the cover in the closed position and with the hemispherical brew prevent member in the de-actuated, brew enable position shown in FIG. 9.

Referring now to FIG. 11, when the beverage dispenser is ready for receipt of beverage, the various components are in the configuration shown in FIGS. 3, 4 and 11. The handle 52 is down; the funnel assembly 70 is seated with the funnel housing 68 seated within the access opening 66 and the electronic component module housing 162 is seated in the section 98 of the cover base 48. The closure cover 50 is in a lowered nestled position between the relatively raised, C-shaped, mirror image sections 84 and 86 and is locked in the closed position by the latch assembly 51. The funnel access opening 56 is open and uncovered and ready for receipt of freshly brewed coffee or other beverage. All the top surfaces of the top assembly 126 are substantially flush with each other.

During the brew cycle, the stopper 54 is in the inoperative position shown in FIG. 11 and partly received within a concave nest 210 in the top of the cover base 48 and the closure cover 50 the closed position shown in FIG. 11. At the end of the brew cycle, the beverage dispenser 20 is removed from beneath the brewer 60.

Figure 9:
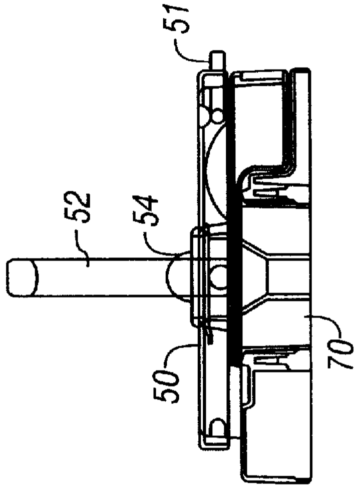
FIG. 9 is another sectional side elevation view of a portion of the dispenser similar to that of FIG. 8 but with the carrying handle in a raised position for carrying a non-empty dispenser to a serving location remote from the brew location.

The funnel access opening 66 is then closed with the stopper 54 to reduce the loss of heat and steam from the beverage inside the hollow body 22. Closure also prevents anything from falling into the funnel 68 and prevents anyone from intentionally adulterating the beverage by dropping something into the funnel access opening 66. In accordance with the invention this is achieved with the movably mounted, brew disablement and closure member 54 that is movably attached to and part of the closure cover assembly 50. The cover closure latch assembly 51 is manually actuated to unlatch the cover closure 50 from the closure base 48 and is tilted upwardly to a position shown in FIG. 10. In this elevated position, the hemispherical stopper member 54 is then pivotally moved to the position shown in FIG. 7 with the stopper mounting plate 206 pressed against the bottom surface of the closure cover 50 and the stopper member 54 protruding trough the funnel access opening 56. A tight frictional fit of the base of the hemispherical stopper member 54 with the sides of the funnel access opening momentarily assists in holding the stopper member 54 in place while the closure cover 50 is lowered to the closed position shown in FIG. 8, and as described with reference to FIG. 2. The ends 124 and 126 of the latch members are automatically guided and cammed into interlocking relationship with the latch member receiving holes 212 by the partially spherical guide detents 120 and 122 that face upwardly for guiding receipt of the ends of the latch members as it is moved to a closed position. The stopper in this operative, or closed, position prevents any entry of any foreign matter into the beverage dispenser as well as disables the dispenser from receiving a fresh batch of beverage by providing an overall height dimension to the beverage dispenser. then manually moved to then manually moved will fall is held against the underside of the cover closure 50 scover top by means of mating releasable snap-fasteners 160 carried by the plate 156 and the underside 152. The plate 156 or the stopper 150 is then manually grasped and pivoted to the position shown in FIG. 7 with the stopper protruding through the funnel access opening 142 from the underside 152 to the top surface of the cover top 136. A snug fit keeps the stopper 150 within the funnel access opening while the cover is lowered to the position shown in FIG. 8 and the cover is re-latched in position with the cover latch assembly 51. The handle 52 may then be lifted to a carry position shown in FIG. 9, and the filled beverage dispenser 20 is carried to a serving cart or directly to a serving location remote from the brewer 60.

Figure 8:
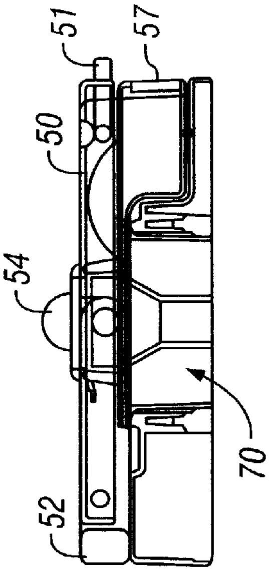
FIG. 8 is a sectional side elevation view of a portion of the dispenser with the pivot cover in a lowered, closed position with the hemispherical brew disable member in the actuated, or prevent position, shown in FIG. 7.

With the stopper 54 in this closed position shown in FIG. 8, the stopper 150 protrudes sufficiently above the uppermost surface of the collar 57 to block and thereby prevent insertion of the beverage dispenser 20 beneath the bottom of the brew basket 58 to receive hot freshly brewed coffee, as shown in FIG. 3 Thus, accidental use of a filled beverage dispenser 20 for receipt of additional beverage that could result in overflow is prevented. In addition, preferably the stopper 150 is a contrasting color relative to the remainder of the cover assembly 98, or at least of the top of the cover assembly, so that it can be readily seen, even from a distance. Preferably, the top surface of the cover assembly 40 is black, gray or white and the color of the stopper is "fire engine red", "caution orange" or the like.

Figure 10:
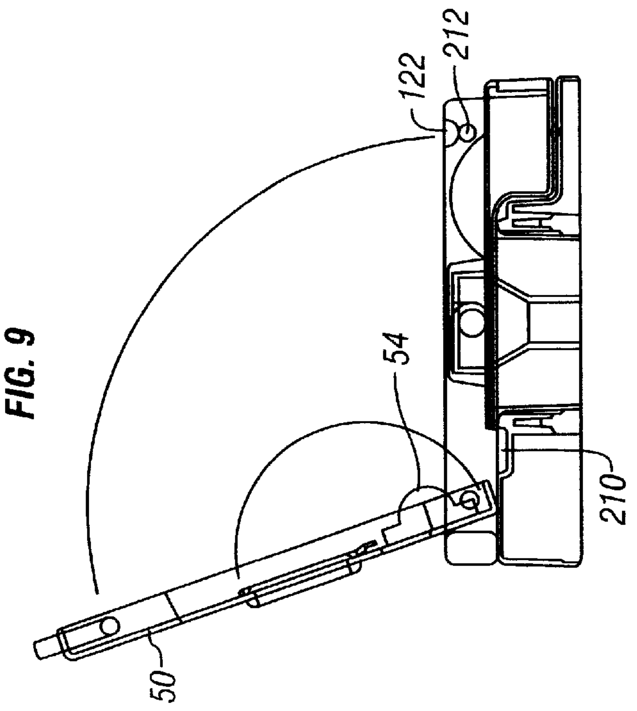
FIG. 10 is another sectional side elevation view similar to that of FIG. 7 but with the cover closure in an elevated position to enable movement of the hemispherical brew prevent member to a de-actuated, brew enable position.
Figure 7:
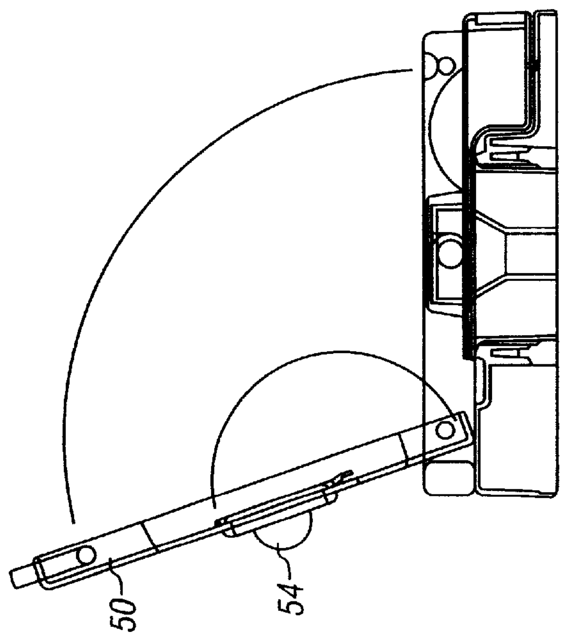
FIG. 7 is a side elevation view of the upper portion of the dispenser with the pivotally mounted cover closure in a raised open position to enable movement of the hemispherical brew disable member to be pivoted into an actuated, or brew disable, position and the carrying handle in a lowered, non-carry position to block pivotal movement of the cover closure beyond the angular position shown.

After the beverage dispenser 20 has been emptied of beverage or the beverage has become to old or cold and it is desired to refill the beverage dispenser 20, then the cover is moved back to the position shown in FIG. 7; the stopper is moved to the nonactuated, hidden position shown in FIG. 10, and then the cover is returned to the position shown in FIG. 11.

Figure 12:
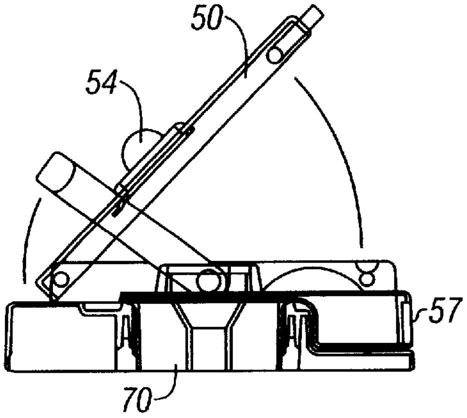
FIG. 12 is another side elevation view of a portion of the dispenser with the carrying handle in a partially raised cover closure removal enable position in which the closure member may be slid out from its pivot axle sockets to be removed entirely from the closure base.
Figure 13:
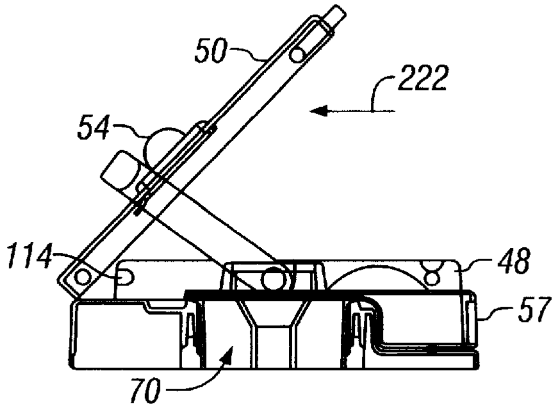
FIG. 13 is another side elevation view similar to that of FIG. 12 but in which the pivot axle stubs have been removed from the axle stub sockets within which they are normally restrained against lateral and vertical movement to enable removal of the cover closure assembly.
Figure 14:
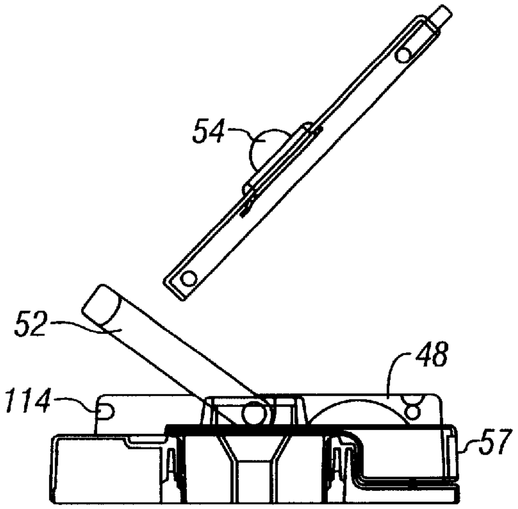
FIG. 14 is another side elevation view of an upper portion of the cover assembly but with the removable cover closure entirely removed from the cover base.

After repeated use, it is necessary to clean the interior of the hollow body 22 and the funnel 72 and other parts of the funnel assembly 70 and to clean the interior end of the drainpipe 220 connected to the bottom of the hollow body 22 and extending beneath the hollow body to the inlet of the faucet 34. Referring to FIGS. 12, 13 and 14, this is accomplished by removing the pivotally mounted cover closure 50 from the closure base 48. This is accomplished by first unlatching the cover closure 50 while lifting the handle 52 to a non-blocking position as shown in FIG. 12. Then the cover closure 50 is pushed in the direction of arrow 222 until the axle stubs 196 and 198 are slid out of the back openings of the axle stub support slots 112 and 114, respectively, as shown in FIG. 13. Then the cover closure 50 may be lifted from the cover base 48 and entirely removed from the cover base 48, as shown in FIG. 14. Then the funnel assembly 70 may be removed from the access opening 56 and access obtained to the interior of the hollow body 22 for cleaning or repair or replacement of the funnel assembly.

While a particular embodiment has been disclosed above, it should be appreciated that variations may be made without departing from the spirit and scope of the invention as defined in the appended claims.

What is claimed is:

1. In a beverage dispenser having a hollow body with a closed bottom, a top assembly with an inlet for passing beverage into the hollow body, an enclosing sidewall extending between the top assembly and the bottom, a faucet mounted to the hollow body adjacent the bottom for dispensing beverage contained within the hollow body, the improvement being a cover assembly, comprising:

a cover with an inlet access opening means for mounting the cover for movement between an operative position in which the inlet access opening is aligned with the inlet and the cover overlies the top assembly, and an inoperative position; and means movably mounted to the cover for selectively closing the inlet access opening to prevent access to the inlet when the cover is in the operative position and the inlet access opening is aligned with the inlet.

2. The beverage dispenser of claim 1 in which the selectively closing means includes a closure member, and means for mounting the closure member for movement relative to the cover between a closed position in which the closure member closes the inlet access opening and an open position in which the closure member is spaced from the inlet access opening to enable the passage of beverage through the inlet access opening and the inlet and into the hollow body.

3. The beverage dispenser of claim 2 in which the mounting means includes means for pivotally mounting the closure member to the cover.

4. The beverage dispenser of claim 2 in which the cover has an underside adjacent the top when in an operative position and the mounting means includes means for pivotally mounting the closure member to the underside of the cover.

5. The beverage dispenser of claim 2 in which the cover has an underside located adjacent the top when in an operative position and the mounting means includes means for mounting the closure member to the underside of the cover.

6. The beverage dispenser of claim 2 in which the closure member extends above inlet access opening and the cover when in the closed position.

7. The beverage dispenser of claim 6 in combination with a beverage brewer with a brew basket at a level to block entry of the hollow body beneath the brew basket with the inlet aligned with the brew basket by means of lateral engagement with the closure member extending above the cover.

8. The beverage dispenser of claim 7 in which the closure member extends through the inlet access opening from an underside of the cover that is adjacent to the top when the cover is in an operative position.

9. The beverage dispenser of claim 6 in which the closure member extends through the inlet access opening from an underside of the cover that is adjacent to the top when the cover is in an operative position.

10. The beverage dispenser of claim 1 in which the closure member is disabled from movement relative to the cover when the cover is in the operative position.

11. The beverage dispenser of claim 1 in which the closure member has a color that contrasts with a color of the cover to enhance visibility of the cover when in the closed position.

12. The beverage dispenser of claim 1 in which the closure member has a hemispherical surface that extends above the top when in the closed position.

13. The beverage dispenser of claim 1 in which the top has a mounting recess for nestled receipt of at least a portion of the closure member when the closure member is in the open position and the cover is in an operative position.

14. The beverage dispenser of claim 1 in which the cover includes a manually actuated latch to releasably lock the cover in the operative position.

15. The beverage dispenser of claim 1 including a handle and means for movably mounting the handle to the top for movement between an upwardly extending carry position and a generally horizontal non-carry position.

16. The beverage dispenser of claim 15 in which the cover is mounted for pivotal movement between the operative position and the inoperative position and the handle is positioned relative to a path of movement of the cover to limit such pivotal movement when the handle is in the generally horizontal non-carry position.

17. The beverage dispenser of claim 15 in which the cover is removably mounted to the top and the handle is positioned relative to the cover to block removal of the cover when the handle is in the generally horizontal non-carry position.

18. The beverage dispenser of claim 17 in which the top has a pair of pivot axle stub receiving slots and the cover has a pair of mating pivot axle stubs receivable within the pair of slots respectively and the handle when in the generally horizontal non-carry position is located relative to the slots to block removal of the pivot axle stubs from the slots.

19. The beverage dispenser of claim 1 in which the top has a pair of pivot axle stub receiving slots and the cover has a pair of mating pivot axle stubs receivable within the pair of slots respectively and means for preventing sliding removal of the stubs from the stub receiving slots.

20. The beverage dispenser of claim 19 in which the preventing means includes a manual latch member carried by the cover to latch the cover against sliding movement relative to the top in a direction transverse to the axle stubs.

21. The cover assembly of claim 1 including a funnel assembly, means for removably mounting the funnel assembly within the inlet, and means means associated with the cover for blocking removal of the funnel assembly from the inlet.

22. The beverage dispenser of claim 21 including means for establishing a seal between the inlet and the funnel assembly when the funnel assembly is mounted within the inlet.

23. The beverage dispenser of claim 21 in which the funnel has a funnel body supported within a surrounding insulating body that is received within the inlet and the inlet is sufficiently large to enable manual access to the interior of the hollow body.

24. The beverage dispenser of claim 1 in which the means for mounting the cover includes a cover base mounted to the top and having an elevated section with a top that is substantially flush with the cover when the cover is in an operative position.

25. The beverage dispenser of claim 24 in which the cover base has a non-elevated section that is contoured for snug receipt of the cover when in the operative position.

26. The beverage dispenser of claim 24 including a handle pivotally attached to the cover base that is substantially flush with the cover when the cover is in the operative position and the handle is in an inoperative position resting within a non-elevated handle receiving section of the cover base.

27. In a beverage dispenser having a hollow body, a closed bottom, a top with an inlet for passing beverage into the hollow body, an enclosing sidewall extending between the top and the bottom, a faucet mounted to the hollow body adjacent the bottom for dispensing beverage contained within the hollow body, the improvement being a cover assembly, comprising:

a top assembly with an inlet for mounting sealed receipt of a funnel assembly;

a cover base mounted to the top assembly and having a pair of upper sections on either side of an intermediate recessed section for nestled receipt of a movably mounted cover for covering the inlet;

means carried by the cover base and adjacent opposite ends of the pair of upper sections for mounting the cover for movement between an operative position in which the cover is nestled between the pair of upper sections and the inlet is covered, and an inoperative position in which the cover is not nestled and the inlet is not covered; and another recessed section surrounding a portion of each of the pair of upper sections and a portion of the cover base located between the pair of upper surfaces for receipt of a carry handle; and a carry handle;

means carried by the cover base and adjacent the opposite ends of the upper sections for mounting the carry handle for movement between a non-carry position in which an uppermost surface of the handle is flush with the pair of upper surfaces, and a carry position.

28. The beverage dispenser of claim 27 in which the carry handle mounting means includes inwardly facing pivot axle receiving bores within opposed vertical faces of the upper surfaces and pivot axle stubs on opposite sides of carry handle.

29. The beverage dispenser of claim 28 in which the carry handle when in the non-carry position is positioned to block the cover from pivotal movement beyond a preselected maximum inoperative position.

30. The beverage dispenser of claim 27 including a funnel assembly with an electronic component housing with an electronic display connected to a funnel and in which the cover base includes a recessed section for nested receipt of the component housing.

31. The beverage dispenser of claim 30 in which the closure cover has a concavity for protective receipt of the component housing when the closure cover is in a closed position.

* * * * *